United States Patent [19]
Naylor

[11] 3,904,173
[45] Sept. 9, 1975

[54] BUTTERFLY VALVE ASSEMBLY

[75] Inventor: Alexander L. Naylor, Binghamton, N.J.

[73] Assignee: The Fairbanks Company, Binghamton, N.Y.

[22] Filed: Dec. 10, 1973

[21] Appl. No.: 423,097

[52] U.S. Cl. ............... 251/306; 251/308; 137/375
[51] Int. Cl. ...... F16k 1/22; F16k 41/00; F16l 58/00
[58] Field of Search .................. 251/214, 304–308, 251/368; 137/375, 454.2

[56] References Cited
UNITED STATES PATENTS

| | | | |
|---|---|---|---|
| 3,100,500 | 8/1963 | Stillwagon | 137/375 |
| 3,204,927 | 9/1965 | Killiam | 251/306 |
| 3,233,861 | 2/1966 | Stillwagon | 251/306 X |
| 3,341,170 | 9/1967 | Housworth | 251/306 |
| 3,346,005 | 9/1967 | Hanssen | 137/375 |
| 3,425,439 | 2/1969 | Duffey et al. | 251/308 X |
| 3,534,939 | 10/1970 | Frazier et al. | 251/306 |
| 3,565,394 | 2/1971 | Smith | 251/306 |
| 3,596,876 | 8/1971 | Scaramucci | 251/306 |
| 3,598,365 | 8/1971 | Werra | 251/307 |
| 3,642,247 | 2/1972 | Scaramucci | 251/306 X |
| 3,661,171 | 5/1972 | Smith et al. | 137/375 |
| 3,749,359 | 7/1973 | Montesi | 251/306 |

Primary Examiner—Charles J. Myhre
Assistant Examiner—Ira S. Lazarus
Attorney, Agent, or Firm—Edward F. Levy

[57] ABSTRACT

A butterfly valve assembly includes an elastomeric liner bonded to the inside of the valve body and extending into the neck portion of the valve body. The portion of the elastomeric liner which extends into the neck portion of the valve body encircles the valve stem. A pair of integrally molded circumferential protrusions in the elastomeric liner press against the valve stem and form a leak-proof seal between the elastomeric liner and the valve stem.

6 Claims, 4 Drawing Figures

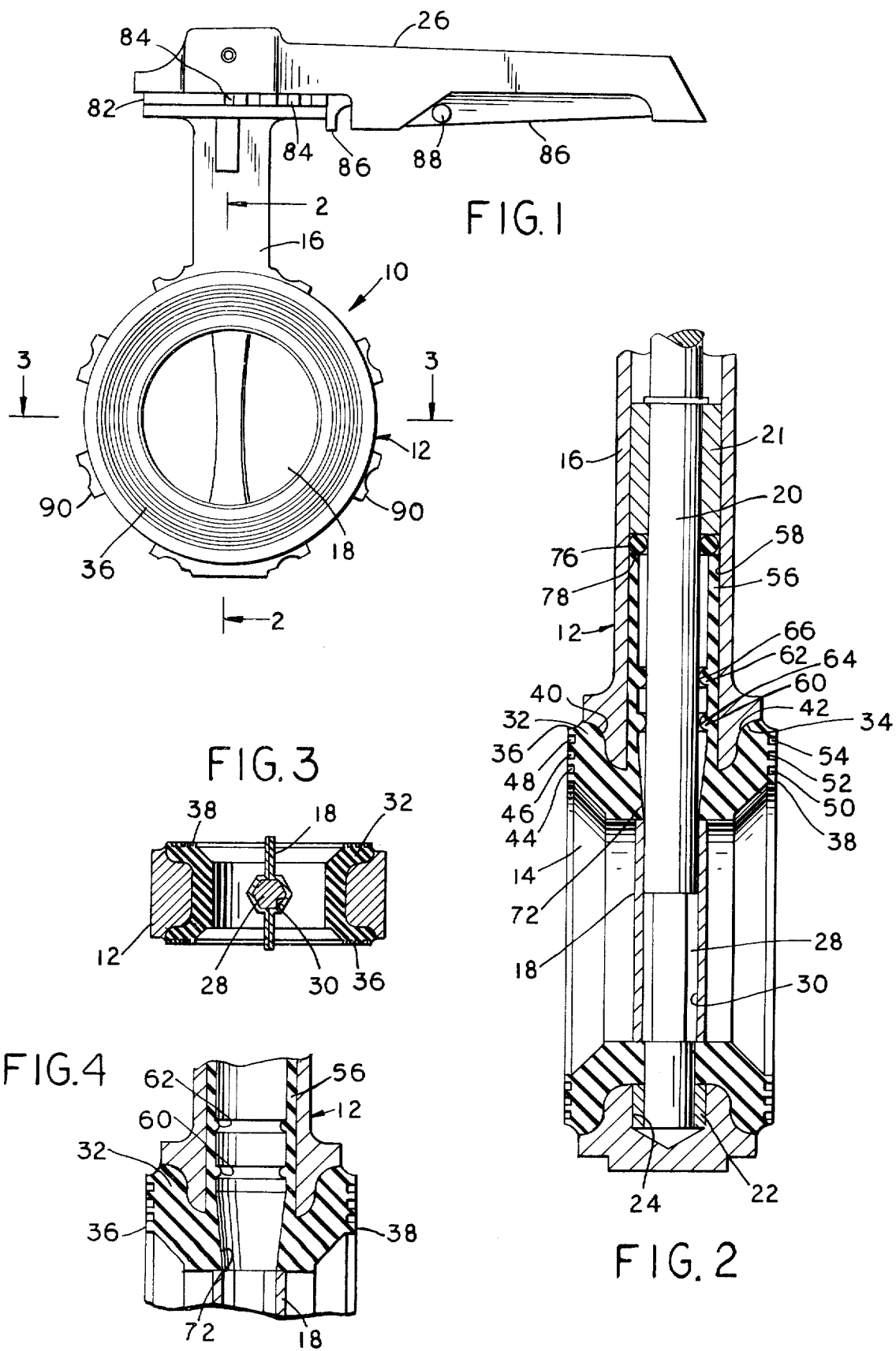

BUTTERFLY VALVE ASSEMBLY

Conventional butterfly valves include a hollow valve body enclosing a pivotally mounted disc which is turned within the valve body by means of an attached valve stem for the purpose of increasing and decreasing the flow of fluids or gasses through the valve body. In order to provide a seal between the edges of the disc and the inside of the valve body, an elastomeric liner is molded on the inside surface of the valve body. When the valve is in the closed position, the edges of the disc bear against the liner and prevent flow through the valve. In addition to this seal, a seal is required between the valve stem and the valve body.

In conventional butterfly valves, the valve stem seal is formed in one of several ways, including the provision of a loose O-ring retained within a metal clip which is bonded to a portion of the elastomeric liner, and the provision of a chevron-type packing disposed between the valve stem and the valve body. These conventional valve stem seal structures present various disadvantages. There is usually need for the stocking and assembling of a relatively large number of component parts for the assembly or the overhaul of a valve, with the possibility that the wrong valve stem seal may be installed or that the valve stem seal may be improperly installed resulting in leakage when the valve is put into service. In addition, the fact that conventional valve stem seals must provide two sealing interfaces, namely the interface between the seal and the valve stem and the interface between the seal and the valve body, results in the possibility of leakage through either or both of these interfaces.

It is an object of the present invention to overcome the above disadvantages inherent in conventional butterfly valves by providing a butterfly valve having an elastomeric liner incorporating integral valve stem sealing means.

Another object of the invention is to provide a butterfly valve having an elastomeric liner extending into the neck portion of the valve body.

Another object of the invention is to provide a butterfly valve incorporating valve stem sealing means which can be manufactured using low cost manufacturing techniques which are not subject to errors in assembly.

Still another object of the invention is to provide a butterfly valve incorporating valve stem sealing means made of the same elastomer as the elastomeric liner in the valve body.

In accordance with the invention there is provided a butterfly valve having a valve body with a disc attached to a valve stem which is pivotally mounted within the valve body. The valve stem extends through the neck portion of the valve body for the purpose of operating the valve. An elastomeric liner is bonded to the inside of the valve body. The elastomeric liner extends into the neck portion and encircles a portion of the valve stem. A pair of integrally molded circumferential protrusions in the elastomeric liner project inwardly and press very tightly against the valve stem and provide a seal between the elastomeric liner and the valve stem. The elastomeric liner has a tapered portion which is disposed at the intersection of elastomeric liner in the neck portion with the elastomeric liner in the valve body, thus making the change in cross-section of the elastomeric liner gradual and facilitating the molding process.

Additional objects and advantages of the invention will become apparent during the course of the following specification when taken in connection with the accompanying drawings, in which:

FIG. 1 is an elevational view of a butterfly valve made in accordance with the present invention;

FIG. 2 is an enlarged cross-section taken along the line 2—2 of FIG. 1;

FIG. 3 is a sectional view taken along line 3—3 of FIG. 1; and

FIG. 4 is a partial sectional view similar to FIG. 2, but showing the interior of the valve prior to insertion of the valve stem therein.

Referring in detail to the drawings, there is shown in FIG. 1 an assembled butterfly valve 10 made in accordance with the present invention, and including a valve body 12 having a central cavity 14 and a hollow neck portion 16. A disc 18 is attached to a valve stem 20 in the manner presently to be described, and the valve stem 20 is rotatably mounted in an upper bearing 21 and a lower bearing 22, as shown in FIG. 2. The upper end of the valve stem 20, which is not shown, is attached to an actuating lever 26 for the purpose of turning the valve stem 20 and the disc 18 to modify or close off flow through the central cavity 14 of butterfly valve 10.

As shown in FIG. 3, the valve stem 20 has an intermediate portion 28 of hexagonal cross-section. This hexagonal stem portion 28 fits within a closely-matching hexagonally-shaped aperture 30 in the disc 18. This construction is an improvement over the construction of conventional butterfly valves wherein a pin is driven through a hole passing through the disc and the valve stem in order to couple the disc and the valve stem. Such conventional pin coupling results in a local reduction of the cross-sectional area of the valve stem and a local concentration of stress which can lead to a failure of the valve stem. The hexagonal portion 28 of the valve stem shown herein eliminates the need for reduction of the cross-sectional area of this portion.

The butterfly valve 10 is provided with an elastomeric liner 32 which is secured to the valve body 12 by bonding it to the inner surface of the valve body. The liner 32 is formed with integrally-molded circular flange portions 36 and 38 which extend outwardly of the valve body 12 and overlie outer faces 40 and 42 of the valve body. The integrally-molded flange portion 36 includes concentric circular grooves 44, 46 and 48 in the face thereof, and the flange portion 38 similarly includes concentric circular grooves 50, 52 and 54 in the face thereof. The projecting grooved faces of the flange portions 36 and 38 provide effective annular seals when the butterfly valve is mounted between adjacent sections of pipe, without requiring the use of additional gaskets. The concentric grooves 44, 46, 48 and 50, 52, 54 aid in sealing the flange portions 36 and 38 against the respective pipe sections, without leakage.

As shown in FIG. 4, the elastomeric liner 32 also includes an integrally molded tubular neck portion 56 which extends into the hollow neck portion 16 of the valve body 12 and is bonded to the inner surface 58 of said hollow neck portion. The molded neck portion 56 is formed on its inner surface with annular beads 60 and 62 of semi-circular cross-section in the nature of O-rings. These annular beads 60 and 62 project inwardly toward the valve stem 20 when the latter is inserted, and form a tight double seal against said valve stem. The annular beads 60 and 62 provide integral O-rings segments which cooperate with the valve stem 20 to form a seal preventing leakage along the butterfly valve stem in pressure applications, and also preventing leakage of atmospheric air into the butterfly valve 10 in vacuum applications.

The incorporation of integrally molded sealing means in elastomeric liner 32, in accordance with the present invention, eliminates the need for retaining and positioning means for independent seals as are required in conventional butterfly valves. Mis-assembly of the valve stem seal resulting from operator error during assembly is eliminated in the butterfly valve 10 in accordance with the present invention. In addition, when reviewing the materials of the butterfly valve 10 for determining compatibility with various fluids, fewer components must be reviewed than in conventional valves since the valve stem seal and the elastomeric liner are made of the same material.

Elastomeric liners for butterfly valves are conventionally manufactured of such elastomers as Buna N, EPT, Viton, Hypalon and Neoprene. The individual elastomers are selected for use in accordance with varying requirements for resistance to various fluids and for resistance to various service temperatures. The butterfly valve 10 in accordance with the present invention eliminates the need for manufacturing and stocking individual valve stem seals in each of the above materials in order to obtain a valve stem seal of the optimum material, thus resulting in savings of cost and manufacturing efficiency. Thus elastomeric liner 32, in accordance with the present invention, can be manufactured in any of the above materials.

The valve stem seal produced by the integral liner construction of the present invention is more effective than conventional valve stem seals heretofore used. In conventional butterfly valves the O-ring or chevron type seal normally employed to seal the valve stem must resiliently conform both to the surface of the valve stem and to the inside surface of the valve body. This requirement often results in leakage occuring both at the seal-valve stem interface and at the seal-valve body interface. In the butterfly valve 10, according to the present invention, the number of interfaces at which leakage can occur has been reduced from two to one (the seal-valve stem interface) with a consequent increase in sealing effectiveness and reliability. The annular beads or O-ring segments 60 and 62 being integrally molded portions of the elastomeric liner 32, eliminates the possibility that the seal can fail as a result of a failure of separate seal retaining means such as are required in conventional butterfly valves.

Although two annular beads or O-ring segments 60 and 62 are shown in FIG. 2, it is understood that the integral valve stem seal in accordance with the present invention will function with one O-ring segment for applications requiring a lower pressure seal.

One of the significant advantages of the present invention is that the number of valve stem sealing elements can be easily increased during the design of an individual valve without a consequent increase in the number of components required, simply by increasing the number of O-ring segments.

The elastomeric liner 32 also includes an inwardly-tapered portion 72, as shown in FIG. 4, which permits the easy insertion of the valve stem 20 into the valve body 12 during assembly. When the valve stem 20 is inserted, the O-ring segments 60 and 62 are compressed and press firmly against the surface of the valve stem to provide a leak-proof seal therewith. The tapered portion 72 of the elastomeric liner 32 provides a gradual transition between the elastomeric liner 32 in the central cavity 14 of the valve body 12 and the neck portion 56 of the elastomeric liner 32, thus facilitating the molding of the elastomeric liner 32. A standard O-ring 76 is positioned on the top surface 78 of the neck portion 56 of the elastomeric liner 32 and is retained by the upper bearing 21 which is in the nature of a bronze bushing overlying said O-ring 76. The O-ring 76 is an additional sealing member for the valve stem 20 and serves to prevent atmospheric corrosion since there is nothing else to prevent moisture or the like from passing down the stem cavity from the top.

For ease of assembly, the stem 20 is coated with a silicone grease so that it slides freely past the O-ring 76, the molded O-ring segments 60 and 62, and through the tapered portion 72 of the elastomeric liner 32; the stem being press-fitted at these four points to provide a tight seal. It will be appreciated that if the molded elastomeric liner were to provide a tight press fit along the entire length of the stem 20, it would cause substantial binding which would make the valve difficult or impossible to operate. The seals provided by the O-ring, the O-ring segments, and the tapered portion of the liner provide sealing contact along spaced circumferential lines, which provide a tight press fit, but not along enough surface area to impair operation.

It will also be appreciated that the extrusion of the elastomeric liner into the neck of the valve body compensates for irregularities caused by machining the very long stem bores in the valve body. It is extremely difficult to drill a precisely parallel bore in the lengths necessary for various sizes of butterfly valves; the drilling tool often wobbling and tending to make the bore barrel-shaped. In addition, tool marks and other irregularities constantly appear on the bore surface, which are compensated for when the elastomeric liner is molded within the bore.

The butterfly valve 10 incorporates throttle plate 82 to display the setting of the valve 10, that is, the position of the disc 18 with respect to the valve body 12. The throttle plate 82 displays the position of the operation lever 26 which is attached to the valve stem 20 with its axis parallel to the plane of the disc 18. The throttle plate 82 incorporates a series of notches 84 into which can be placed a locking lever 86 which is pivotally attached to the operator lever 26. A hole 88 is provided in the locking lever 86 for insertion of the hasp of padlock to prevent pivoting of the locking lever 86 to an open position away from the notches 84.

The valve body 12 incorporates a plurality of semicircular guides 90 integrally formed on the outside of the valve body 12 for the purpose of positioning the valve body 12 relative to bolts holding the butterfly valve 10 between pipe flanges.

While a preferred embodiment of the invention has been shown and described herein, it is obvious that numerous omissions, changes and additions may be made in such embodiment, including the application of the valve stem seal and elastomeric liner described herein to valve types other than butterfly valves, without departing from the spirit and scope of the invention.

What is claimed is:

1. A butterfly valve assembly comprising a valve body having a central cavity bordered by opposed outer faces and a hollow neck portion communicating with said central cavity, a valve stem pivotally mounted within said hollow neck portion, a disc disposed within said central cavity for the purpose of modifying and reversibly closing off flow through the butterfly valve assembly, attachment means for attaching said disc to said valve stem, an elastomeric liner molded and bonded on the outer faces of said valve body adjacent to said central cavity and providing a seal between said disc and said valve body, said elastomeric liner being formed with an integral cylindrical extension extending into said hollow neck portion and encircling said valve stem, said extension being molded onto and bonded to the inner surface of said hollow neck portion and being formed with at least one integral circumferential annular bead extending inwardly into said hollow neck portion, with said bead projecting toward said valve stem and pressing firmly against the outer surface of said valve stem for the purpose of providing a seal between said elastomeric liner extension and said valve stem.

2. A butterfly valve assembly according to claim 1 wherein said annular bead has the form of a ring of semicircular cross-section having a curved surface extending toward said valve stem.

3. A butterfly valve assembly according to claim 1 wherein said valve stem has an elongated body portion of circular cross-section and said attachment means include a hexagonal portion formed on an intermediate portion of said valve stem, and a hexagonal aperture formed along a diameter of said disc and receiving said hexagonal stem portion.

4. A butterfly valve assembly according to claim 1 wherein said elastomeric liner has a tapered portion located beneath said circumferential annular bead adjacent the junction between said liner and said extension.

5. A butterfly valve assembly according to claim 1 including an O-ring encircling said valve stem and disposed against the upper edge of said elastomeric liner extension.

6. A butterfly valve assembly according to claim 1 wherein a pair of spaced annular beads are molded integrally upon the inner surface of said elastomeric liner extension.

* * * * *